(12) United States Patent
Bryant et al.

(10) Patent No.: US 11,403,127 B2
(45) Date of Patent: *Aug. 2, 2022

(54) GENERATING A VIRTUAL MACHINES RELOCATION PROTOCOL

(71) Applicant: INTERNATIONAL BUSINESS MACHINES CORPORATION, Armonk, NY (US)

(72) Inventors: Jay S. Bryant, Rochester, MN (US); James E. Carey, Rochester, MN (US); Zachary A. Hill, Muskegon, MI (US); Kendall J. Nelson, St. Paul, MN (US); Lucas A. Palm, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/589,403

(22) Filed: Oct. 1, 2019

(65) Prior Publication Data

US 2020/0026547 A1 Jan. 23, 2020

Related U.S. Application Data

(63) Continuation of application No. 15/345,675, filed on Nov. 8, 2016, now Pat. No. 10,545,777.

(51) Int. Cl.
*G06F 9/455* (2018.01)
*G06F 9/48* (2006.01)
(Continued)

(52) U.S. Cl.
CPC ........ *G06F 9/45558* (2013.01); *G06F 1/3203* (2013.01); *G06F 9/4856* (2013.01);
(Continued)

(58) Field of Classification Search
CPC .... G06F 9/5077; G06F 9/5088; G06F 9/4856; G06F 11/203; G06F 11/2046
See application file for complete search history.

(56) References Cited

U.S. PATENT DOCUMENTS 7,840,992 B1 11/2010 Dufrene et al.
7,975,165 B2 7/2011 Shneorson et al.
(Continued)

FOREIGN PATENT DOCUMENTS

CN 102629224 B 11/2014
JP 2011-008780 A 1/2011
(Continued)

OTHER PUBLICATIONS

Polze, Andreas at al. "Timely virtual machine migration for proactive fault tolerance." 2011 14th IEEE International Symposium on Object/Component/Service-Oriented Real-Time Distributed Computing Workshops. IEEE. (Year: 2011).*

(Continued)

*Primary Examiner* — Lewis A Bullock, Jr.
*Assistant Examiner* — Gilles R Kepnang
(74) *Attorney, Agent, or Firm* — Christopher Pignato, Esq.; Kevin P. Radigan, Esq.; Heslin Rothenberg Farley & Mesiti P.C.

(57) ABSTRACT

Relocation of virtual machines is facilitated by obtaining, by a first controller, first power-related information from a first power system set that provides power to a first set of powered hardware components, where the first set of powered hardware components are running a first plurality of virtual machines. The first controller generates a relocation protocol for migrating the first plurality of virtual machines based, at least in part, upon the first power-related information. The relocation protocol includes: a migration of a first subset of one or more virtual machines so that the first subset (Continued)

of virtual machine(s) is to be migrated to and run on a second set of powered hardware components in a manner such that the first subset of virtual machine(s) continues to operation in a substantially continuous manner through the migration; and a snapshotting of a second subset of one or more virtual machines.

20 Claims, 10 Drawing Sheets

(51) Int. Cl.
*G06F 1/3203* (2019.01)
*G06F 9/50* (2006.01)
*G06F 11/20* (2006.01)
*G06F 1/3206* (2019.01)

(52) U.S. Cl.
CPC ........ *G06F 1/3206* (2013.01); *G06F 9/45533* (2013.01); *G06F 9/5088* (2013.01); *G06F 11/2046* (2013.01); *G06F 2009/4557* (2013.01); *G06F 2009/45583* (2013.01)

(56) References Cited

U.S. PATENT DOCUMENTS

| | | | |
|---|---|---|---|
| 9,336,042 B1 | 5/2016 | Brenneman et al. | |
| 9,513,945 B2 | 12/2016 | Shimogawa | |
| 9,575,789 B1* | 2/2017 | Rangari | G06F 9/45558 |
| 9,652,326 B1 | 5/2017 | Bauer et al. | |
| 9,703,592 B2* | 7/2017 | Cropper | G06F 9/5088 |
| 10,970,110 B1* | 4/2021 | Gupta | G06F 9/5077 |
| 2008/0222375 A1* | 9/2008 | Kotsovinos | G06F 9/5083 |
| | | | 711/162 |
| 2009/0031307 A1 | 1/2009 | Chodroff et al. | |
| 2009/0204718 A1* | 8/2009 | Lawton | G06F 9/5077 |
| | | | 709/230 |
| 2009/0249332 A1* | 10/2009 | Hoehle | G06F 9/45558 |
| | | | 718/1 |
| 2009/0262741 A1 | 10/2009 | Jungck et al. | |
| 2010/0250824 A1 | 9/2010 | Belay | |
| 2010/0332889 A1* | 12/2010 | Shneorson | G06Q 10/04 |
| | | | 714/2 |
| 2011/0022812 A1* | 1/2011 | van der Linden | H04L 69/08 |
| | | | 711/E12.001 |
| 2011/0161491 A1 | 6/2011 | Sekiguchi | |
| 2012/0005344 A1* | 1/2012 | Kolin | H05K 7/20836 |
| | | | 715/733 |
| 2012/0036383 A1 | 2/2012 | Iwata et al. | |
| 2012/0084445 A1* | 4/2012 | Brock | G06F 9/5077 |
| | | | 709/226 |
| 2012/0096460 A1* | 4/2012 | Sekiguchi | G06F 9/45558 |
| | | | 718/1 |
| 2012/0102492 A1* | 4/2012 | Iwata | G06F 9/45533 |
| | | | 718/1 |
| 2012/0166644 A1* | 6/2012 | Liu | G06F 9/4856 |
| | | | 709/226 |
| 2012/0198253 A1* | 8/2012 | Kato | H02J 3/14 |
| | | | 713/320 |
| 2013/0111492 A1* | 5/2013 | Nojiri | G06F 1/3203 |
| | | | 718/104 |
| 2013/0185420 A1 | 7/2013 | Shimogawa | |
| 2013/0262390 A1 | 10/2013 | Kumarasamy et al. | |
| 2014/0108854 A1* | 4/2014 | Antony | G06F 11/2046 |
| | | | 714/4.2 |
| 2014/0130040 A1* | 5/2014 | Lemanski | G06F 9/4856 |
| | | | 718/1 |
| 2014/0215172 A1* | 7/2014 | Tsirkin | G06F 11/2046 |
| | | | 711/162 |
| 2015/0007178 A1* | 1/2015 | Kaneko | G06F 9/5088 |
| | | | 718/1 |
| 2015/0088586 A1 | 3/2015 | Pavlas et al. | |
| 2015/0128052 A1* | 5/2015 | Grehan | G06F 9/45558 |
| | | | 715/735 |
| 2015/0160972 A1 | 6/2015 | Yu et al. | |
| 2015/0350155 A1* | 12/2015 | Diaz | H04L 45/50 |
| | | | 370/235 |
| 2016/0013992 A1 | 1/2016 | Reddy et al. | |
| 2016/0117185 A1* | 4/2016 | Fang | G06F 9/45558 |
| | | | 718/1 |
| 2016/0188378 A1 | 6/2016 | Chao et al. | |
| 2016/0344821 A1* | 11/2016 | Khosrowpour | H04L 67/1029 |
| 2016/0349820 A1 | 12/2016 | Baker | |
| 2017/0031745 A1* | 2/2017 | Koike | G06F 11/0709 |
| 2017/0322241 A1* | 11/2017 | Tang | H02J 13/00 |
| 2017/0329546 A1* | 11/2017 | Chen | G06F 3/0653 |
| 2018/0129523 A1 | 5/2018 | Bryant et al. | |
| 2018/0314602 A1* | 11/2018 | Speks | H04W 8/30 |
| 2018/0329737 A1* | 11/2018 | Dong | G06F 9/5077 |

FOREIGN PATENT DOCUMENTS

| | | |
|---|---|---|
| JP | 2013-148984 A | 8/2013 |
| JP | 2014-052687 A | 3/2014 |
| JP | 2015-043215 A | 3/2015 |

OTHER PUBLICATIONS

IBM, "z/Architecture Principles of Operation," IBM® Publication No. SA22-7832-10, Eleventh Edition, Mar. 2015, pp. 1-1732.
IBM, "Power ISA™ Version 2.07B," International Business Machines Corporation, Apr. 9, 2015, pp. 1-1527.
Mell et al., "The NIST Definition of Cloud Computing", National Institute of Standards and Technology, U.S. Dept, of Commerce, NIST Special Publication 800-145 (Sep. 2011) (7 pages).
Hirofuchi et al., "Making VM Consolidation More Energy-Efficient by Postcopy Live Migration", Cloud Computing 2011: 2nd International Conference on Cloud Computing, GRIDS, and Virtualization, 2011, pp. 195-204.
Bryant et al., "List of IBM Patents and/or Patent Applications Treated as Related", U.S. Appl. No. 16/589,403, filed Oct. 1, 2019, dated Oct. 1, 2019 (2 pages).
JP Decision to Grant a Patent issued for JP Patent Application No. 2017-212984, dated Feb. 2, 2021 (English Translation) (5 pages).

* cited by examiner

GENERATING A VIRTUAL MACHINES RELOCATION PROTOCOL

BACKGROUND

As known, a virtual machine (VM) is a software implementation of a machine (e.g., a computer) that executes computer programs. A VM typically emulates a physical computing environment, with requests for a central processing unit (CPU), memory, hard disk, and other hardware resources being managed by a virtualization layer which translates these requests to the underlying physical hardware. Virtual machines are created within a virtualization layer, such as a hypervisor or a virtualization platform that runs on top of a client or server operating system. System migrations of virtual machines may be desired for a variety of reasons, including the ability to provide a backup system while hardware and/or software upgrades are being installed. System migrations may also be performed to move a virtual machine to a new processor or other hardware. There are a number of approaches to performing the migration, including halting execution of a virtual machine to perform the migration, as well as performing a live migration, which migrates a virtual machine while it is executing. Live virtual machine migration is often desired by companies with mission critical systems.

Data center power outages can occur for a variety of reasons, including natural disasters. Natural disasters or other weather-related causes have become a more frequent variable in the availability of data centers. To ensure that a data center, including any virtual machines running within the data center, can remain running while experiencing a main power outage, battery backup systems and gas-powered generators may be used to continue to power the data center, for instance, to facilitate an ordered shutdown and/or backup of running systems. In many cases, however, data may end of being lost due to inefficient backup mechanisms, or backup mechanisms that are never started, or that fail to complete before battery backup systems run out of energy, or backup generators run out of fuel.

SUMMARY

Shortcomings of the prior art are overcome and advantages are provided through the provision of a computer-implemented method which includes obtaining, by a first controller, first power-related information from a first power system set including one or more first power systems that provide power to a first set of powered hardware components with which the first controller is associated. The first set of powered hardware components runs a first plurality of virtual machines, and the first power-related information includes an estimated amount of time to power failure to the first set of powered hardware components. The method also includes determining, by the first controller, that the estimated amount of time to power failure is an insufficient amount of time to live-migrate all virtual machines of the first plurality of virtual machines; and obtaining, by the first controller, network power-related information from a power system providing power to a network with a data transfer path from the first set of powered hardware components to a second set of powered hardware components, where the power system providing power to the network is other than the one or more first power systems providing power to the first set of powered hardware components. In addition, the method includes dynamically generating, by the first controller, a relocation protocol for migrating the first plurality of virtual machines based, at least in part, upon the first power-related information and the network power-related information, the relocation protocol being an emergency relocation protocol dynamically generated based, at least in part, on the estimated amount of time to power failure to the first set of powered hardware components being insufficient to live-migrate all virtual machines of the first plurality of virtual machines. The generating includes assigning, by the first controller, a virtual machine of the first plurality of virtual machines to a first subset of one or more virtual machines of the first plurality of virtual machines to be live migrated, or a second subset of one or more virtual machines of the first plurality of virtual machines to be snapshotted for migration. The assigning is based, at least in part, upon the first power-related information and the network power-related information, including the estimated amount of time to power failure. The relocation protocol includes: a live migrating of the first subset of one or more virtual machines of the first plurality of virtual machines so that the first subset of virtual machine(s) is to be migrated to and run on a second set of powered hardware components, the live migration being in a manner such that the first subset of virtual machine(s) continues to operate in a continuous manner through the migration; and a snapshotting of the second subset of the one or more virtual machines of the first plurality of virtual machines at the first set of powered hardware components. Further, the method includes migrating the first plurality of virtual machines, using the relocation protocol, to the second set of powered hardware components.

Advantageously, in one or more aspects, a computer-implemented method, system and computer program product are provided for facilitating dynamic generation of a relocation protocol for virtual machines based, at least in part, upon power-related information obtained from, for instance, a first power system set providing power to a first set of powered hardware components upon which the virtual machines run. The relocation protocol for migrating the virtual machines may include: a migration of a first subset of one or more virtual machines so that the first subset of virtual machine(s) is to be migrated to run on a second set of powered hardware components in a manner that the first subset of virtual machine(s) continues to operate in a substantially continuous manner through the migration; and a snapshotting of a second subset of one or more virtual machines of the virtual machines running on the first set of hardware components. By dynamically determining the relocation protocol, processing is better able to prioritize migration of virtual machines to ensure a more efficient transfer of virtual machines from, for instance, the first set of powered hardware components to the second set of powered hardware components. This relocation protocol may seek to minimize or reduce loss of data due, for instance, to a natural disaster occurring in the vicinity of the first set of powered hardware components, causing an upcoming loss of power at the first set of powered hardware components.

As explained further herein, generating the relocation protocol may include referencing historical data relating to virtual machine migration or virtual machine snapshotting to facilitate placing one or more of the virtual machines in either the first or second subset of virtual machines. For instance, the historical data may include information on a length of time required to live-migrate or snapshot a virtual machine of a particular type, workload size, etc.

Additionally, or alternatively, the relocation protocol may be generated using associated priority information of one or more of the virtual machines to be migrated. For instance, in one or more embodiments, a customer may pay for a higher priority of service in the event of a power failure, and thus, the one or more virtual machines running that client's workload may be identified for live-migration. Further, generating the relocation protocol may take into account the power status of intermediate hardware components and data paths between, for instance, a first data center and a second data center, any may even include identifying the particular data center, or second set of powered hardware components to which the virtual machines are to be migrated, as well as the data path to be used.

In one or more implementations, the computer-implemented method further includes: migrating the first subset of virtual machine(s) to the second set of powered hardware components in a manner such that the first set of virtual machine(s) continues to operate in a substantially continuous manner through the migration; and migrating the second subset of virtual machine(s) by, at least in part, deploying the second subset of virtual machine(s) to the second set of powered hardware components based on a respective snapshot(s) of the second subset of virtual machine(s) obtained at the first set of powered hardware components. By way of example, the migrating of the second subset of virtual machine(s) may be performed after completion of the migrating of the first subset of virtual machine(s).

In one or more embodiments, the migrating of the second subset of virtual machine(s) may include first transferring the respective snapshot(s) of the virtual machine(s) of the second subset of virtual machine(s) to an intermediary set of powered hardware components powered by an intermediary power system set, that is, before deploying the second subset of virtual machine(s) to the second set of powered hardware component(s), based on the respective snapshot(s). In such embodiments, the intermediary power system set is different from the first power system set, and the transferring of the respective snapshot(s) of the virtual machine(s) of the second subset of virtual machine(s) to the intermediary set of powered hardware components may occur substantially simultaneous with the migrating of the first subset of virtual machine(s) to the second set of powered hardware components.

In one or more implementations, the first set of powered hardware components are of a first cloud, and the first controller is a first cloud controller, and the second set of powered hardware components are of a second cloud. The second set of hardware components may be powered from a second power system set including one or more second power systems. In one or more embodiments, the first cloud and second cloud may be hosted in different, geographically-separated data centers.

Further, in one or more implementations, the second cloud may include a second cloud controller, and generating, by the first controller, the relocation protocol, may include obtaining, by the first cloud controller, second power-related information from the second cloud controller or the second power system set indicative of power status to the second set of powered hardware components.

In one or more embodiments, generating, by the first controller, the relocation protocol may include referencing historical data relating to at least one of virtual machine migration or virtual machine snapshotting to facilitate placing at least one virtual machine of the first plurality of virtual machines in either the first subset of virtual machine(s) or the second subset of virtual machine(s).

In addition, in one or more embodiments, generating, by the first controller, the relocation protocol may include using associated priority information of at least one virtual machine of the first plurality of virtual machines, and placing the at least one virtual machine in either the first subset of virtual machine(s) or the second subset of virtual machine(s).

In one or more embodiments, generating by the first controller the relocation protocol may include evaluating a data transfer path from the first set of powered hardware components to the second set of powered hardware components. The evaluating the data transfer path may include determining power status to one or more switches in the data transfer path to, for instance, confirm continued availability of the data transfer path.

Systems and computer program products relating to one or more aspects are also described and claimed herein. Further, services relating to one or more embodiments may also be described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
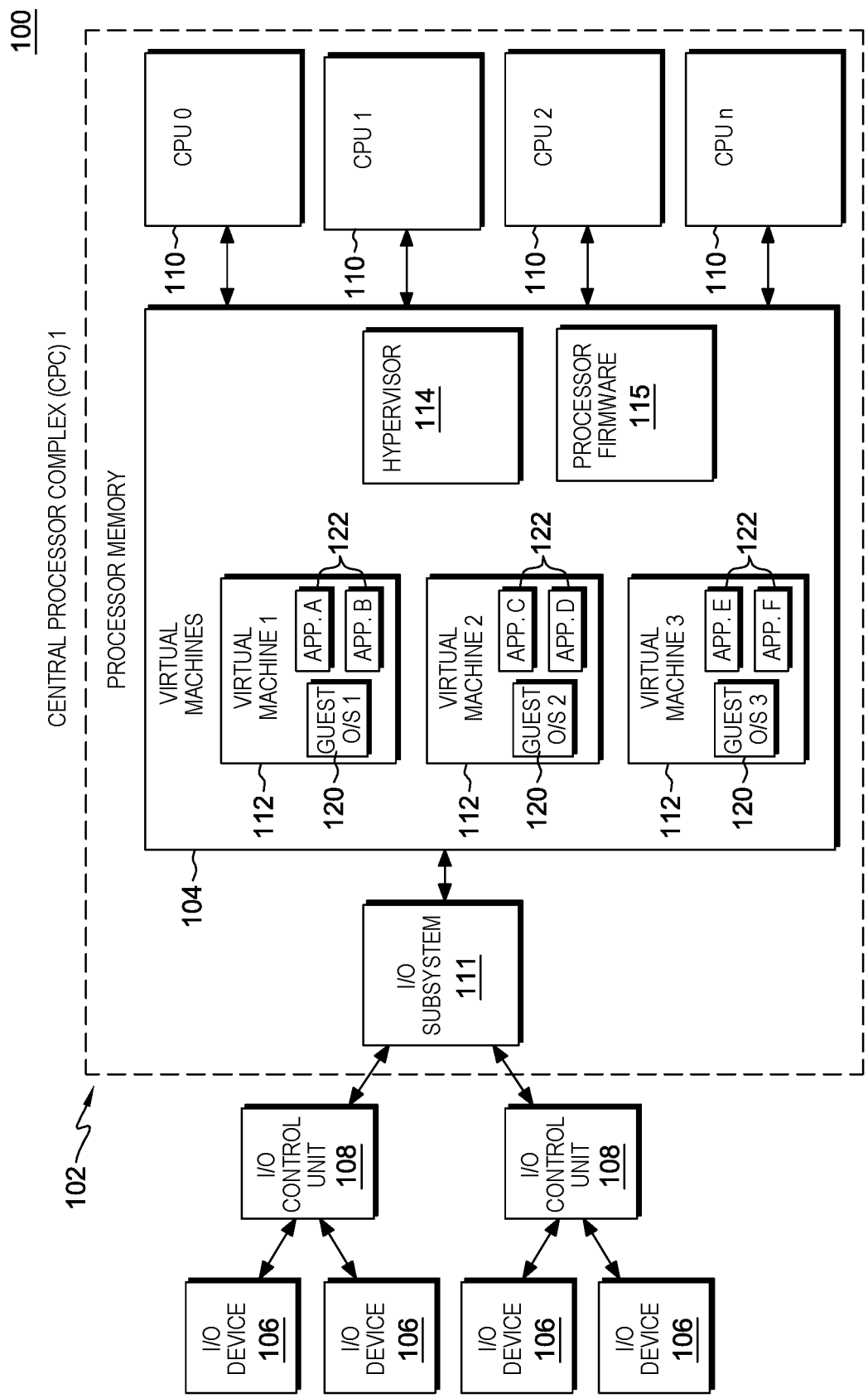
FIG. 1 depicts an example of a virtual computing environment having virtual machines that may undergo a relocation protocol, in accordance with one or more aspects of the present invention.

Previously, virtual machines might be migrated from one data center to another data center as a disaster avoidance solution. For instance, the migrated data may be secondary backup data that has been migrated. However, such data is not as up-to-date as the running virtual machines located in the primary location. Further, there would typically be no way to ascertain whether the second data center location is also being affected by the disaster that is jeopardizing data in the primary, source location.

Therefore, disclosed herein, in one or more aspects, is an efficient use of correlating available runtime power at, for instance, a source system for a first cloud, with time required to evacuate the cloud to avoid system downtime. In particular, disclosed herein in various aspects are approaches for a cloud manager to use information made available from, for instance, a data center disaster recovery application, to determine appropriate action to take for its virtual machines. For instance, in one or more embodiments, data center disaster recovery information and historic information about virtual machines may be used to determine which action is appropriate for each virtual machine, such as live-migrating, snapshotting, or even shutting down a particular virtual machine. By way of example, this may include using historic information on time required for each of the possible actions by a particular virtual machine type or workload size. This includes, for instance, the type of application running on the virtual machine, the type of virtual machine, and the hardware that the virtual machine is running on. In one or more other aspects, using historic information on the times required to transfer the results of each action may be considered. For instance, time to snapshot and send a snapshot versus time to live-migrate a particular virtual machine, might be ascertained. This might also include considering available information about the transfer path from, for instance, the first data center to the second data center. Further, generating the relocation protocol may include selecting the second data center based, for instance, on power availability to the second data center. This may include, for instance, communicating with a second controller of the second data center and/or a second power system set powering the second data center, to determine availability of power at the second data center. Further, this may include taking into account data center disaster recovery information about participants (e.g., switches or other hardware) in the transfer path. For example, is there sufficient power, and thus time, available in the data transfer path to allow the migration or transfer to occur? Also, historic information on performance impacts of recovery status may be considered in generating the relocation protocol.

Analytics may be employed to determine an amount of time remaining, for instance, on a backup generator during a disaster scenario, before the backup generator goes down through, for instance, analysis of historic information. This analysis may include, for instance, evaluating an amount of gas in a generator, and determining that that amount of gas may last a certain amount of hours before the system loses power completely.

Disclosed herein is the concept of accounting for situations where there isn't enough time to live-migrate all of the virtual machines, and instead generate a protocol to take snapshots of selected virtual machines to ensure that nothing is lost, and thereby protecting the most current state of the virtual machines from being lost in the event that there is insufficient power to the source data center or resources available to live-migrate all the virtual machines. Analytics that take into account historical migration times from one virtual machine to another virtual machine could be used to determine if there is time to perform the migration, and in the situations where the generator would run out of power before the migration could complete, a snapshot of the virtual machine could be taken preemptively to avoid data loss. The decision to create a snapshot could be done by an administrator, or it could be set to process automatically, for instance, in cases where the administrator is unavailable. In this way, a new virtual machine could be spun up to the precise state from before power loss, with no loss of data.

Thus, in accordance with one or more aspects, a relocation protocol, such as an emergency relocation protocol, is dynamically generated for transferring virtual machines from, for instance, a first set of powered hardware components (such as a first (or source) system or data center), to a second set of powered hardware components (such as a second (or target) system or data center). The relocation protocol may use, in one or more embodiments, both live migration of a first subset of one or more virtual machines of the virtual machines to be transferred, and a snapshotting of a second subset of one or more virtual machines of the virtual machines to be transferred. The relocation protocol may be dynamically generated based, at least in part, on power-related information obtained from a first power system set of one or more first power systems providing power to, for example, the first set of powered hardware components running the plurality of virtual machines.

In certain embodiments, the first set of hardware components are of a first cloud, the first controller is a first cloud controller, and the second set of powered hardware components are of a second cloud. The second set of powered hardware components are powered from a second power system set including one or more second power systems, where the second power system set may be different from the first power system set. By way of example, the first cloud and the second cloud may be hosted in different, geographically-separated data centers. Further, as described below, one or more intermediary systems, such as one or more intermediary sets of powered hardware components, may be employed to facilitate simultaneous live migration of the first subset of virtual machine(s) and transfer of the respective snapshot(s) of the second subset of virtual machine(s), for instance, across different data paths from the first set of powered hardware components.

In one or more embodiments, the first power-related information includes an estimated amount of time to power failure to the first set of powered hardware components, and the relocation protocol is an emergency relocation protocol, dynamically generated based, at least in part, on the amount of time to power failure to the first set of powered hardware components. By way of example, generating, by the first controller, the relocation protocol may include referencing historical data relating to, for instance, live-migrating of one or more virtual machines and/or snapshotting of one or more virtual machines. For instance, the historical data may include information on the amount of time required to live-migrate a particular virtual machine type or workload size, as well as an amount of time to snapshot a particular virtual machine type or workload. Based on this information, the generating may dynamically determine an appropriate relocation protocol in view of, for instance, the amount of time remaining to power failure to the first set of powered hardware components.

Alternatively, or additionally, generating, by the first controller, the relocation protocol may include using or referencing associated priority information of one or more virtual machines of the first plurality of virtual machines, and placing the one or more virtual machines in either the first subset of virtual machine(s) or the second subset of virtual machine(s) based on the priority information. For instance, clients may subscribe at different levels of priority should an emergency relocation of their workload be required. For instance, a client subscribing at a "Gold Level" may ensure that the virtual machines running its workload be live-migrated from the first set of powered hardware components to the second set of powered hardware components, at least as priority over clients at lower levels of subscription. In such an implementation, the virtual machines associated with the lower levels of subscription may be snapshotted for subsequent deployment on the second set of powered hardware components based, for instance, on the estimated amount of time to power failure.

More particularly, some embodiments of the present invention may include one, or more, of the following features, characteristics, operations, and/or advantages: (i) managing, by a first cloud controller, a first set of power system(s) that provide power to a first set of powered hardware component(s) of a first cloud, with the first set of powered component(s) running a first plurality of virtual machines (VMs); (ii) receiving, by the first cloud controller, and from a first power system of the first set of powered system(s), a first item of power-related information; (iii) determining, by the first cloud controller, a procedure for safely migrating the first plurality of VMs based, at least in part, upon the first item of power-related information; (iv) determination of the procedure for safely migrating the first set of VMs includes: (a) migrating a first subset of VM(s) of the first plurality of VMs so that the first subset of VM(s) to run on a second set of powered hardware component(s) in a manner such that the first subset of VM(s) continue to operate in a substantially continuous manner through the migration, and (b) snapshotting a second subset of VM(s) of the first plurality of VMs; (v) migrating of the first subset of VM(s) of the first plurality of VMs so that the first subset of VM(s) to run on a second set of powered components in a manner such that the first set of VM(s) continues to operate in a substantially continuous manner through the migration; (vi) migrating the second set of VM(s) by deploying them to the second set of powered hardware component(s) based on their respective snapshots; (vii) the migration of the second set of VM(s) may be performed after completion of the migration of the first set of VM(s); (viii) the process does not require adding networks to offload work to another VM; (ix) the process looks at the other VMs available in a network and migrates the work to the optimal location; (x) the process snapshots preemptively so data replication isn't necessary; and/or (xi) the process responds during a disaster to prevent a need for the recovery of data.

One example of a computing environment to incorporate and use one or more aspects of a virtual machine relocation facility such as disclosed herein is initially described with reference to FIG. 1. Referring to FIG. 1, in one example, a computing environment 100 may be based on the z/Architecture, offered by International Business Machines (IBM®) Corporation, Armonk, N.Y. The z/Architecture is described in an IBM Publication entitled "z/Architecture—Principles of Operation," Publication No. SA22-7832-10, 11 Edition, March 2015, which is hereby incorporated by reference herein in its entirety. Z/ARCHITECTURE, IBM, Z/VM and Z/OS (referenced herein) are registered trademarks of International Business Machines Corporation, Armonk, New York. Other names used herein may be registered trademarks, trademarks or product names of International Business Machines Corporation or other companies.

In another example, the computing environment may be based on the Power Architecture, offered by International Business Machines Corporation, Armonk, New York. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

In yet a further example, the computing environment may be based on other architectures offered by International Business Machines Corporation and/or other companies.

Computing environment 100 includes a central processor complex (CPC) 102 providing virtual machine support. CPC 102 is coupled to one or more input/output (I/O) devices 106 via one or more control units 108. Central processor complex 102 includes, for instance, a processor memory 104 (a.k.a., main memory, main storage, central storage) coupled to one or more central processors (a.k.a., central processing units (CPUs)) 110, and an input/output subsystem 111, each of which is described below.

Processor memory 104 includes, for example, one or more virtual machines 112, a virtual machine manager, such as a hypervisor 114 that manages the virtual machines, and processor firmware 115. One example of hypervisor 114 is z/VM®, offered by International Business Machines Corporation, Armonk, New York. The hypervisor is sometimes referred to as the host. Further, as used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

The virtual machine support of the CPC provides the ability to operate large numbers of virtual machines 112, each capable of operating with different programs 122 and running a guest operating system 120, such as Linux. Each virtual machine 112 is capable of functioning as a separate system. That is, each virtual machine can be independently reset, run a guest operating system, and operate with different programs. An operating system or application program running in a virtual machine appears to have access to a full and complete system, but in reality, only a portion of it is available.

Processor memory 104 is coupled to central processors (CPUs) 110, which are physical processor resources assignable to virtual machines. For instance, virtual machine 112 includes one or more logical processors, each of which represents all or a share of a physical processor resource 110 that may be dynamically allocated to the virtual machine.

Further, processor memory 104 is coupled to an I/O subsystem 111. Input/output subsystem 111 directs the flow of information between input/output control units 108 and devices 106 and main storage 104. It is coupled to the central processing complex, in that it can be a part of the central processing complex or separate therefrom.

By way of example, one or more computing environments such as depicted in FIG. 1 may be present within a data center, and as noted, data center power outages can occur for a variety of reasons, including natural disasters. To ensure that a data center, including any virtual machines running on systems within a data center, can remain running while experiencing a main power outage, battery backup systems and/or gas-powered generators may be used to continue to power the data center, at least, for a period of time to, for instance, facilitate an ordered shutdown and/or backup of running systems. In the case of a natural disaster, main power may be out for several days or even weeks. Therefore, disclosed herein, in one or more aspects, is a process for dynamically generating a relocation protocol to relocate virtual machines of a data center to, for instance, another, remote data center, to allow for continued operation of the virtual machines.

Figure 2A:
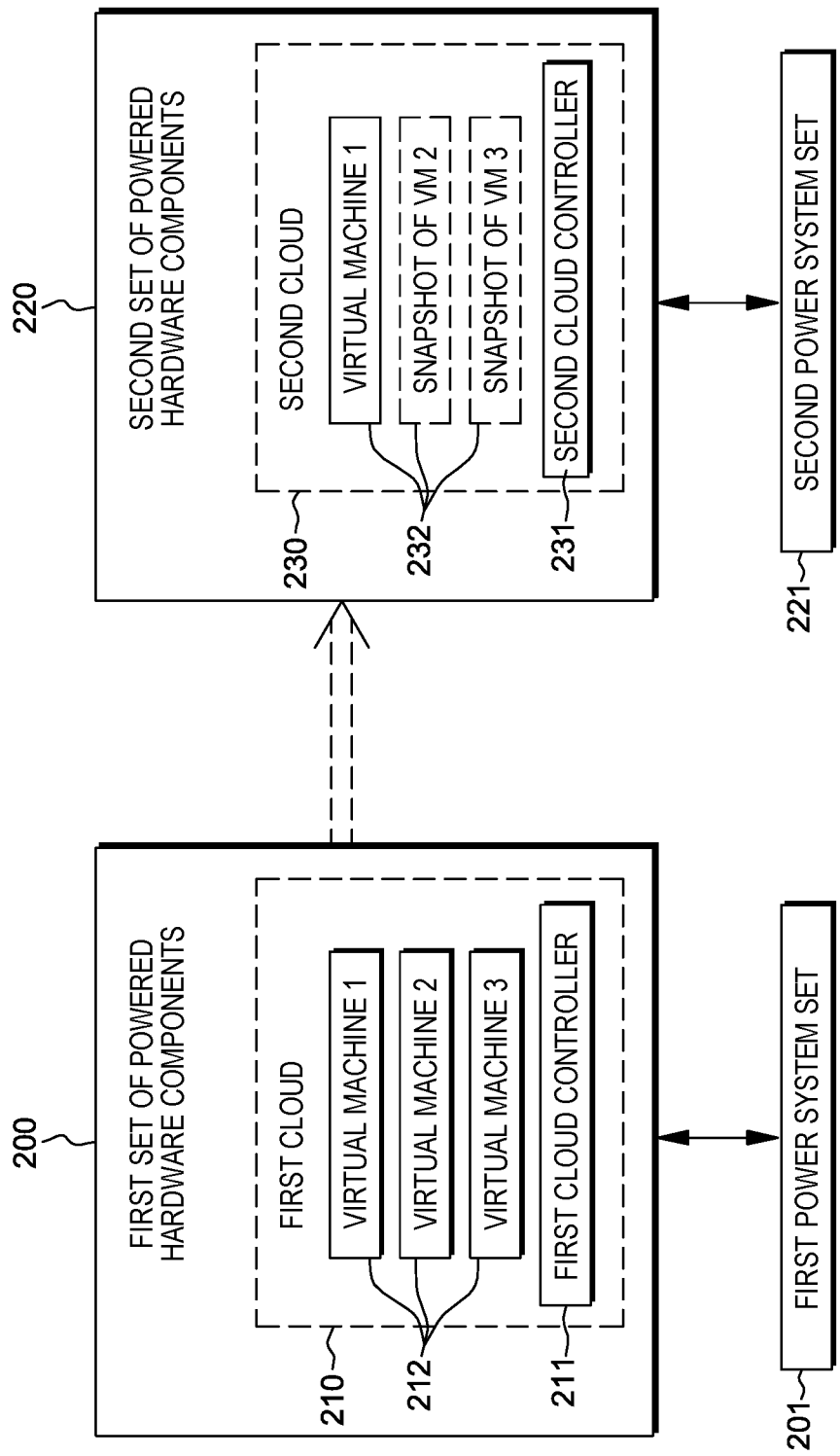
FIG. 2A depicts one embodiment of a transfer of virtual machines from a first set of powered hardware components to a second set of powered hardware components, using a generated relocation protocol, in accordance with one or more aspects of the present invention.

FIG. 2A depicts one embodiment of a process for transferring virtual machines from a first set of powered hardware components 200, such as a source system, or source data center, to a second set of powered hardware components 220, such as a target system, or target data center. First set of powered hardware components 200 is powered by a first power system set 201 of one or more first power systems, and second set of powered hardware components 220 is powered by a second power system set 221 of one or more second power systems. In practice, the first and second power system sets 201, 221 are, at least in part, different sets of power systems. As shown, first set of powered hardware components 200 may include a first cloud environment 210 and second set of powered hardware components 220 may include a second cloud environment 230. First cloud 210 may have a first cloud controller 211, and second cloud 230 a second cloud controller 231. As illustrated, first cloud 210 may also include a plurality of virtual machines 212 running on first set of powered hardware components 200.

As disclosed herein, a controller, such as first cloud controller 211, may be provided with the ability to obtain and leverage data from one or more power systems, such as first power system set 201 and second power system set 221, to dynamically determine or generate a relocation protocol, including where and how to safely evacuate the virtual machines of the associated system, such as first set of powered hardware components 220. This may be particularly beneficial where a natural disaster has occurred which has taken out main power to the first set of powered hardware components 200, and where limited backup power time remains.

As disclosed herein, the controller is provided with a facility or capability to generate a relocation protocol for migrating the plurality of virtual machines 212 based, at least in part, upon power-related information (e.g., first power-related information) obtained from at least the first power system set 201. For instance, the power-related information may include an amount of time remaining before power to the first set of powered hardware components 200 is lost. The relocation protocol may include a migration of a first subset of one or more virtual machines (e.g., virtual machine 1 in FIG. 2A) of the plurality of virtual machines 212 so that the first set of virtual machine(s) is to be migrated to and run on the second set of powered hardware components 220 in a manner such that the first subset of virtual machine(s) continues to operate in a substantially continuous manner through the migration. This migration refers to a live-migration, which is a process of moving a running virtual machine or application between different physical machines without disconnecting the client or application. Memory, storage, and network connectivity of the virtual machine are transferred from an original machine (e.g., first set of powered hardware components 200) to a destination or target machine (e.g., second set of powered hardware components 220). Pre-copy or post-copy memory migration may be employed, and various virtual machine (VM) managers provide live-migration support, as well as various cloud platforms and systems available in the art. By way of specific example, the IBM® POWER Hypervisor™ provides live-migration support.

Additionally, the generated relocation protocol includes a snapshotting of a second subset of one or more virtual machines (e.g., virtual machine 2, virtual machine 3 in FIG. 2A) of the plurality of virtual machines 212. As known, a snapshot preserves the state and data of a virtual machine at a specific point in time. The state includes the virtual machine's power state (for instance, powered on, powered off, or suspended). The data include all the files that make up the virtual machine. This includes disks, memory, and other devices, such as virtual network interface cards. A virtual machine provides several options for creating and managing snapshots and snapshot chains. These operations let the controller create snapshots, revert to any snapshot in the chain, and remove snapshots. Snapshotting is currently supported by various virtual machine (VM) managers, such as with various VMware, Inc., machines. Additionally, snapshotting is supported by various IBM products, including IBM Virtual Servers™ and IBM Cloud Manager™.

In general, the time to create a snapshot and transfer a snapshot from a source system to a target or destination system may be considerably less than the time required to live-migrate a virtual machine from the source system to the destination system. Thus, the power-related information from the first set of power system(s) 201, such as the amount of time power will remain available to first set of powered hardware components 200, may be used by cloud controller 211 in generating the relocation protocol to ensure that substantially all virtual machines are either migrated to the second set of powered hardware components, or snapshotted for transfer to and subsequent deployment at the second set of hardware components.

Figure 2B:
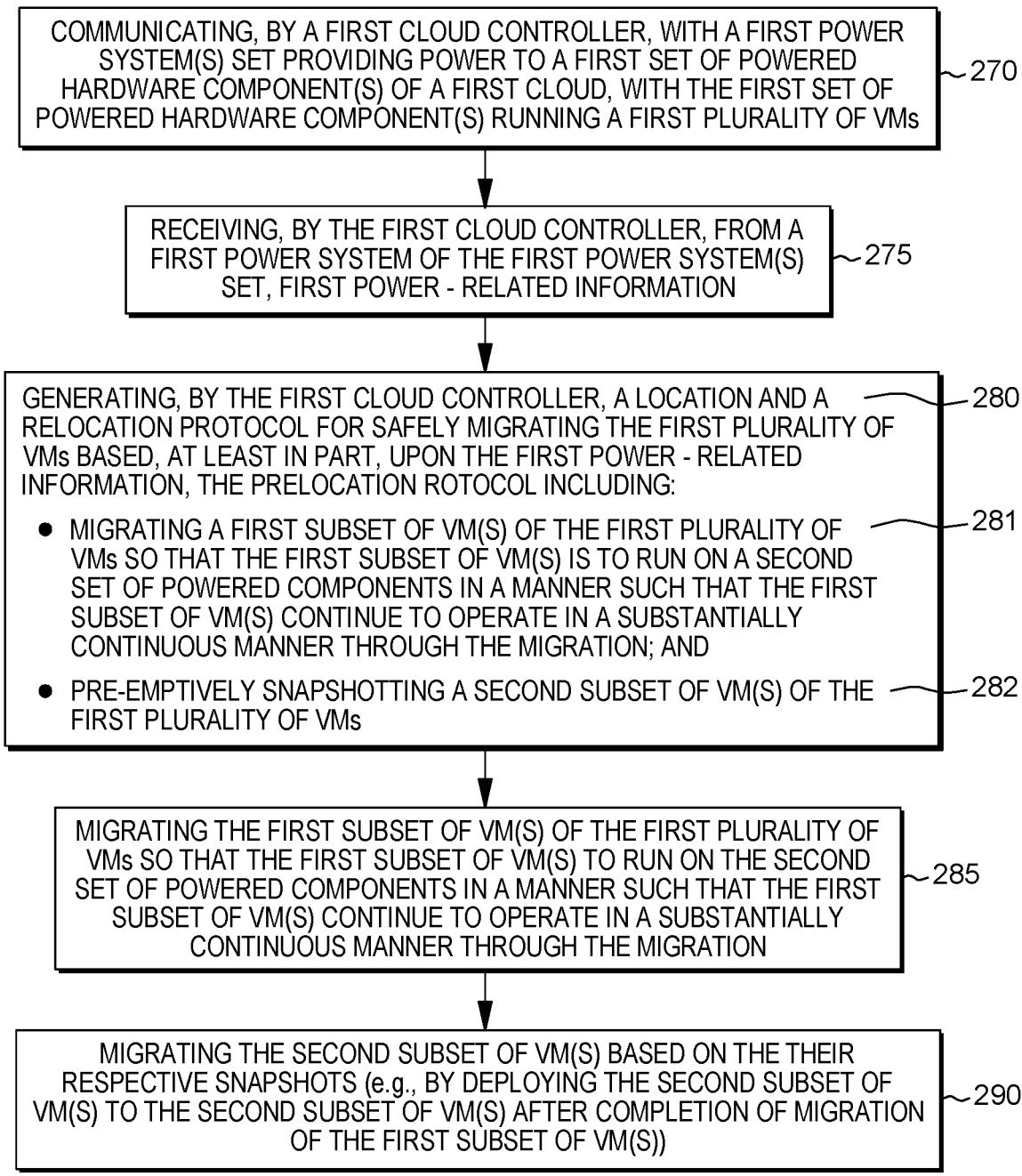
FIG. 2B depicts one embodiment of a process for generating a relocation protocol for migrating a first plurality of virtual machines from, for instance, the first set of powered hardware components to the second set of powered hardware components of FIG. 2A, in accordance with one or more aspects of the present invention.

FIG. 2B depicts one embodiment of a process for dynamically generating a relocation protocol, and then transferring or migrating virtual machines, for instance, during a disaster emergency where virtual machines are to be transferred from one data center to another, remote data center.

Referring to FIG. 2B, the process includes managing, by a first cloud controller, a first power system set providing power to a first set of powered hardware components of a first cloud, with a first set of powered hardware components running a first plurality of virtual machines 270. The first cloud controller receives or obtains from a first power system of the first power system set a first power-related information 275. As noted, this information may include, for instance, an amount of time power is to remain available to the first set of powered hardware components.

The first cloud controller then generates or determines a location and a protocol for safely migrating the first plurality of virtual machines based, at least in part, upon the power-related information obtained 280. The relocation protocol may include: a migration of a first subset of virtual machine(s) of the first plurality of virtual machines so that the first subset of virtual machine(s) is to run on a second set of powered hardware components in a manner such that the first subset of virtual machine(s) continue to operation in a substantially continuous manner through the migration 281; and preemptively snapshotting a second subset of virtual machine(s) of the first plurality of virtual machines 282. The processing may further include migrating the first subset of virtual machine(s) of the first plurality of virtual machines so that the first subset of virtual machine(s) continue to operate in a substantially continuous manner through the migration 285. Further, the second subset of virtual machine(s) may be migrated based on their respective snapshots (for instance, by deploying the second subset of virtual machine(s) to the second set of powered hardware components after completion of migrating of the first subset of virtual machine(s)) 290.

In one or more aspects, the processing disclosed herein is based on a global migratory view, with the cloud controller working with other systems, such as other cloud controllers and other power systems, to look at the availability and efficacy of the systems that it is connected to for migration of the virtual machines. For instance, in the situation where workloads are running in a cloud environment that is potentially going to go down due to, for instance, a loss of power, virtual machines may be migrated to a target or destination cloud that is not failing. In such a case, migration may require quiescing of the virtual machines that are to be moved to the new target cloud, and transferring the data (memory, process state, etc.) to the target cloud. This work may take priority from a bandwidth viewpoint to avoid having the power drop out from under the running virtual machines. In addition, in parallel, virtual machines that are not going to be able to be live-migrated to the target environment may be snapshotted, capturing and saving their state to, for example, disk, in a manner that won't impact the migration of the live virtual machines. Along with being snapshotted, these virtual machines would be shut down until subsequent deployment on the target system.

In one or more embodiments, the controller, such as the cloud controller discussed above, may weigh a number of factors in generating or deciding upon a particular relocation protocol for the virtual machines with which they are associated. These factors may include determining what actions to take, rather than defaulting to either a migrating protocol via pure migration and shutting down, including the option to snapshot one or more of the running virtual machines for transfer. The controller selects or establishes which of the virtual machines are going to be migrated, and which would instead be snapshotted, with the snapshot being transferred to the target or destination system. By way of example, this could include evaluating the historic time to snapshot a virtual machine of a particular type, the resulting size of the snapshot, and the available bandwidth to transmit the snapshot. Further, the cloud controller could examine if the snapshot can be transmitted to an intermediate system or node using, for instance, data paths that would use bandwidth not needed for the migration of one or more other virtual machines. In this manner, the transferred snapshots may subsequently be transferred to the target or destination system for recovery or deployment. Further, the cloud controller may ensure that all transfer nodes (since multiple nodes could be used) are not themselves being evacuated by communicating with the transfer node's cloud controller. If they themselves are also being evacuated, then the controller would look for alternate nodes, such as alternate intermediate nodes, and if none are available, may negotiate with one or other cloud controllers to determine if it will remain running long enough to be used as a transfer node. For intermediate hardware, such as intermediate switches to be used in the transfer, that is, switches in the data path, the cloud controller may work with a cloud controller that the intermediate hardware is associated with, or if they are independent, may communicate with the power system directly that is associated with the intermediate hardware. While the migration of one or more virtual machines is being performed, the one or more virtual machines to be snapshotted may be snapshotted in parallel, and then transferred to the target or destination node, system, data center, etc.

Figure 3A:
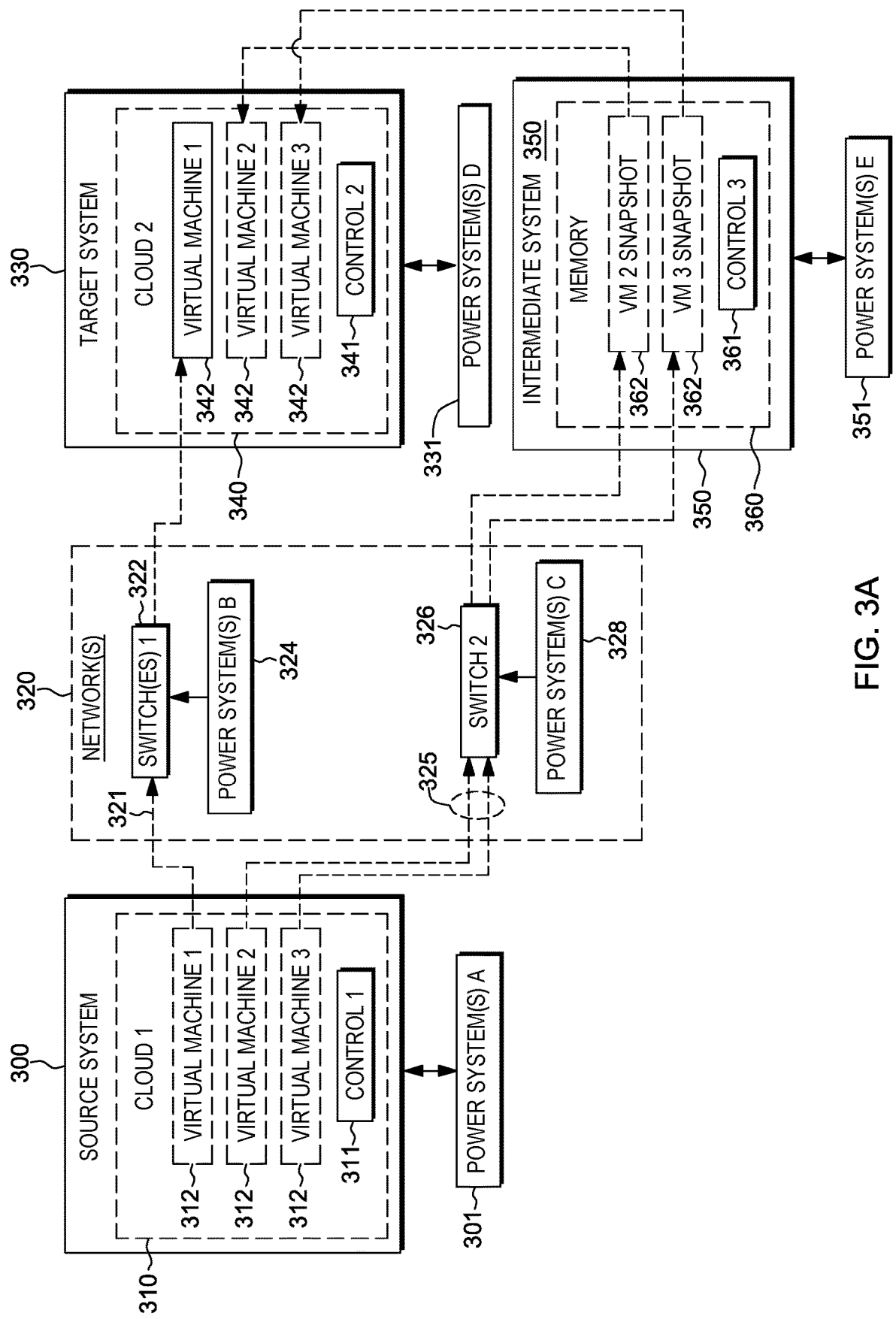
FIG. 3A depicts another embodiment of a transfer of virtual machines from a first set of powered hardware components, or source system, to a second set of powered hardware components, or target system, using a generated relocation protocol which includes live-migrating one or more virtual machines and snapshotting one or more other virtual machines, in accordance with one or more aspects of the present invention.

FIG. 3A depicts a more detailed example of virtual machine migration from, for instance, a source system 300 to a target system 330, which may use, in part, one or more intermediate systems 350. In this embodiment, source system 300, such as a first set of powered hardware components, includes a first cloud 310 with a plurality of virtual machines 312 running, and having an associated control 311. Source system 300 is powered by a first power system set (power system(s) A 301), that includes one or more power systems. The migration of the virtual machines 312 is to occur across a network 320 that may include one or more intermediate hardware components, such as switches 322, 326, each of which is powered by an associated power system set (such as power system(s) B 324, power system(s) C 328), each of which may include one or more power systems.

In this example, target system 330, such as a second set of powered hardware components, may host a second cloud environment 340 which has a second control 341 associated therewith. Target system 330 may also be powered by a second power system set (e.g., power system(s) D 331) of one or more power systems. As noted, one or more intermediate systems 350 may be employed, for example, to facilitate the simultaneous transfer of snapshotted data at the time that one or more virtual machines are being migrated, for instance, across different data paths 321, 325. Intermediate system 350 may include, in one or more examples, memory 360 for receiving virtual machine snapshots 362, and an associated control 361. Intermediate system(s) 350 may be powered by an intermediate power system set (e.g., power system(s) E 351), which may include one or more power systems. In general, the power system sets, such as power system(s) A 301, power system(s) B 324, power system(s) C 328, power system(s) D 331, and power system(s) E 351, may include or be different sets of power systems or, in one or more other embodiments, one or more of them may have the same power system(s), such as power system(s) B 324 and power system(s) C 328 of network 320.

Figure 3B:
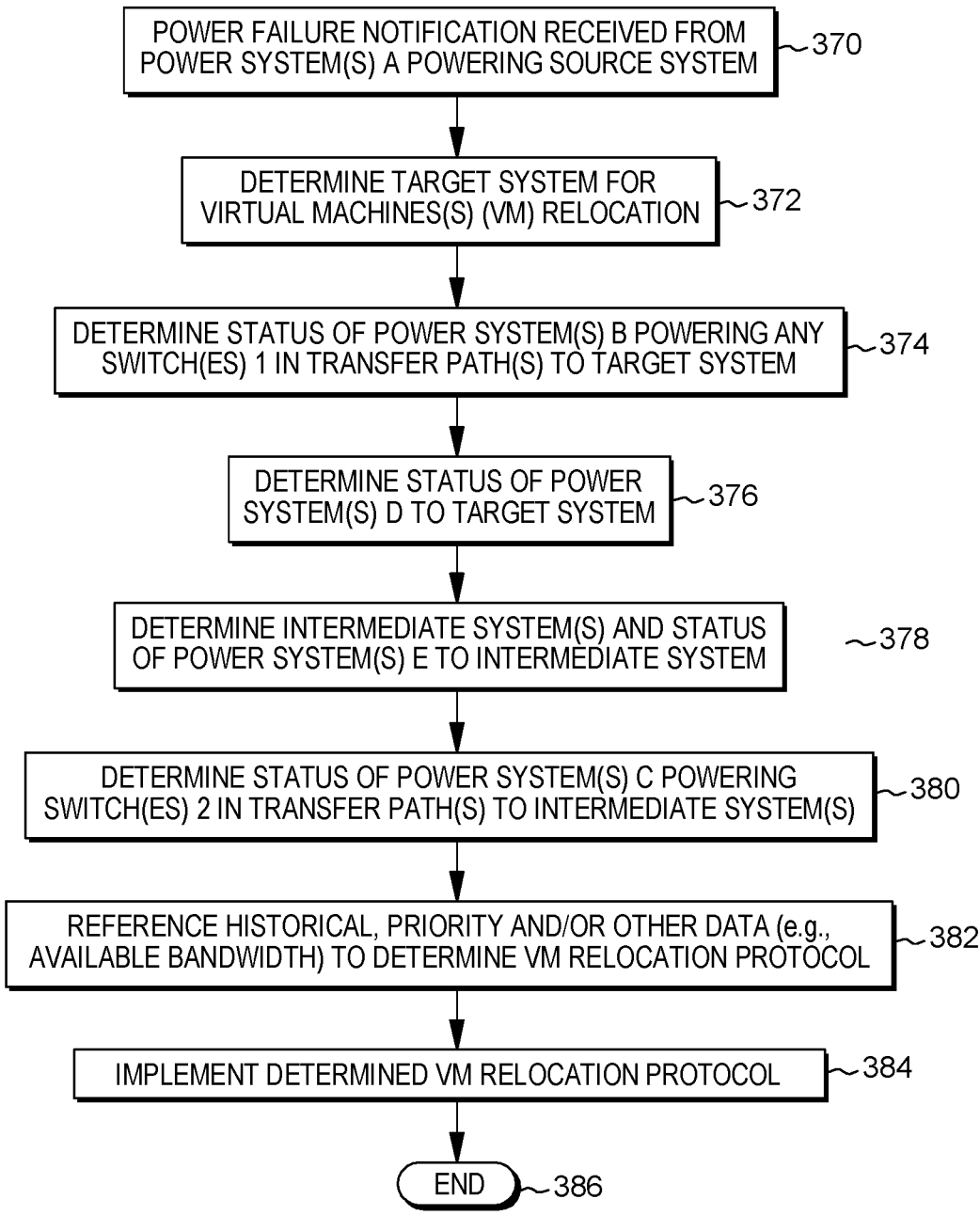
FIGS. 3B & 3C depict one embodiment of a process for generating a relocation protocol for live-migrating one or more virtual machines from the source system to the target system of FIG. 3A, and snapshotting one or more other virtual machines of the source system for subsequent deployment on the target system, in accordance with one or more aspects of the present invention.
Figure 3C:
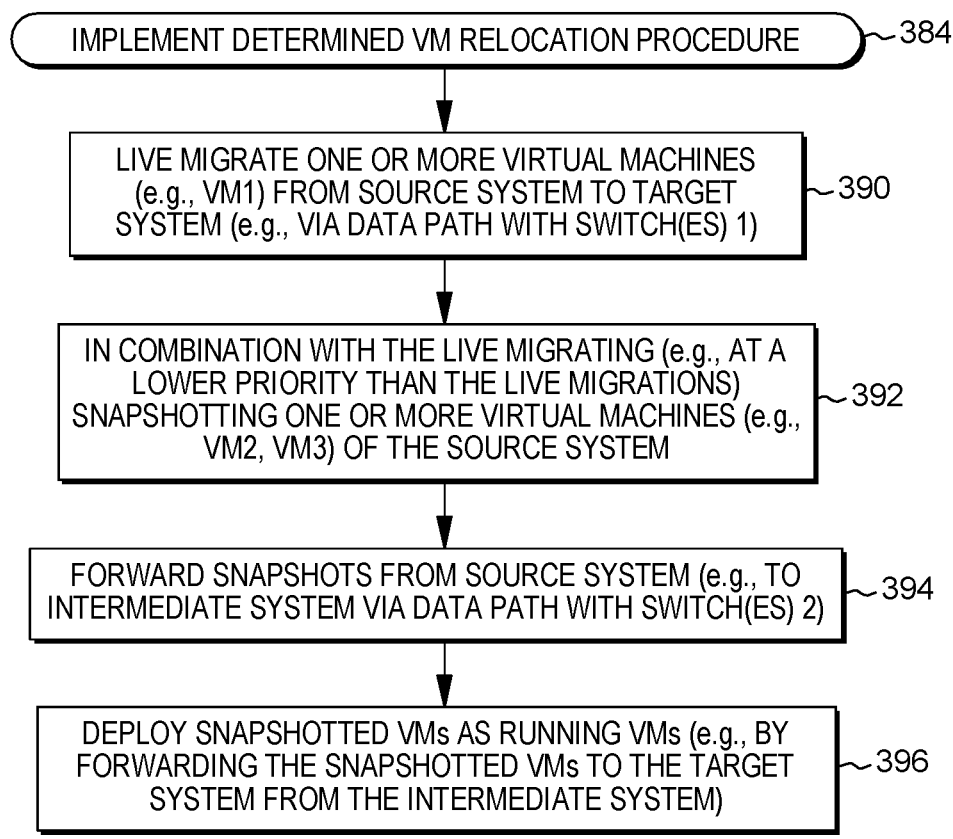

FIGS. 3B & 3C depict one embodiment of a process for migrating virtual machines, in accordance with one or more aspects of the present invention. Referring collectively to FIGS. 3A-3C, a power failure notification may be received from power system(s) A 301 to the source system 370, such as at first cloud control 311. Based on this, the first cloud controller or manager determines where to migrate the virtual machines to, that is, determines the target or destination system (or second set of powered hardware components) 372.

In one or more embodiments, the cloud controller manager 311 may query power systems, such as power system(s) B 324 providing power to switch 1 322 in data path 321, between the source system and the target system 374. Additionally, the cloud control or manager 331 of source system 300 may determine the status of power system(s) D 331 providing power to the target system 376. This may involve the first cloud control 311 querying the second cloud control 341 of target system 330 or, may involve the cloud control 311 communicating directly with power system(s) D 331 to obtain the desired information.

Next, in one or more embodiments, the cloud control 311 may determine one or more intermediate systems or nodes that may accommodate snapshotted data, as well as the status of the power system(s) E 351 to the intermediate system(s) 378. Along with this information, the cloud control or manager may determine the status of power system(s) C 328 powering one or more switches 326 in a data path 325 between the source system and the intermediate system(s) 380. With this information, along with other information, such as historical information on time required to migrate a virtual machine, or snapshot a virtual machine, or priority data where one or more virtual machines of the source system are indicated to the cloud control as having a higher priority, and therefore, to have priority for live-migrating as opposed to being snapshotted, or any other type of data which may be available to the cloud control in deciding whether to place a particular virtual machine 312 into a first subset or a second subset of virtual machines of the relocation protocol 382. Once the virtual machine relocation protocol is generated, then the protocol may be implemented 384, which completes the processing 386. One embodiment for implementing a virtual machine relocation protocol 384 such as described herein is depicted in FIG. 3C.

As illustrated in FIG. 3C, implementing the relocation protocol may include live-migrating one or more virtual machines (e.g., virtual machine 1 in the example of FIG. 3A) from the source system to the target system, for instance, via one or more switch(es) 1 within a data path between the source and target systems 390. In combination with the live-migrating of one or more virtual machines, processing includes snapshotting one or more virtual machines (e.g., virtual machine 2, virtual machine 3) of the source system 392. In one or more implementations, the snapshotting process may be at a lower priority than the live-migration process. Also, in one or more other embodiments, the snapshotting may occur in parallel with the migrating of one or more virtual machines. The snapshot data is forwarded from the source system (for instance, to one or more intermediate systems via one or more data paths), which may include one or more hardware components such as switches 394. After the virtual machine snapshots have been transferred from the intermediate system(s) to the target, destination system, they may be deployed at the target system 396.

Figure 4A:
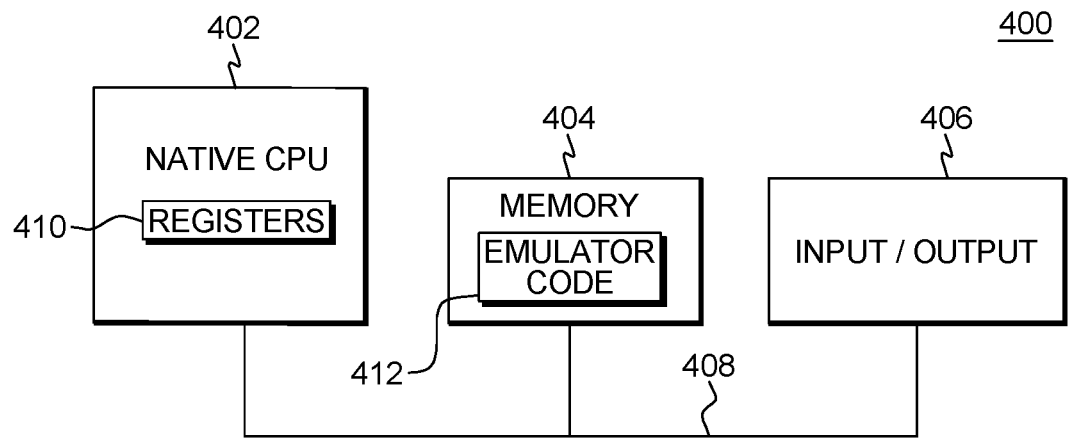
FIG. 4A depicts another example of a computing environment, which may incorporate and use one or more aspects of the present invention.

Another embodiment of a computing environment which may incorporate and use one or more aspects of the virtual machine relocation facility described herein is depicted in FIG. 4A. In this example, a computing environment 400 includes, for instance, a native central processing unit (CPU) 402, a memory 404, and one or more input/output devices and/or interfaces 406 coupled to one another via, for example, one or more buses 408 and/or other connections. As examples, computing environment 400 may include a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 402 includes one or more native registers 410, such as one or more general purpose registers and/or one or more special purpose registers used during processing within the environment. These registers include information that represents the state of the environment at any particular point in time.

Moreover, native central processing unit 402 executes instructions and code that are stored in memory 404. In one particular example, the central processing unit may execute emulator code 412 stored in memory 404. This code enables the computing environment configured in one architecture to emulate one or more other architectures. For instance, emulator code 412 allows machines based on architectures other than the z/Architecture, such as PowerPC processors, Power Systems servers, HP Superdome servers or others, to emulate the z/Architecture® (and/or ESA/390) and to execute software and instructions developed based on the z/Architecture®.

Figure 4B:
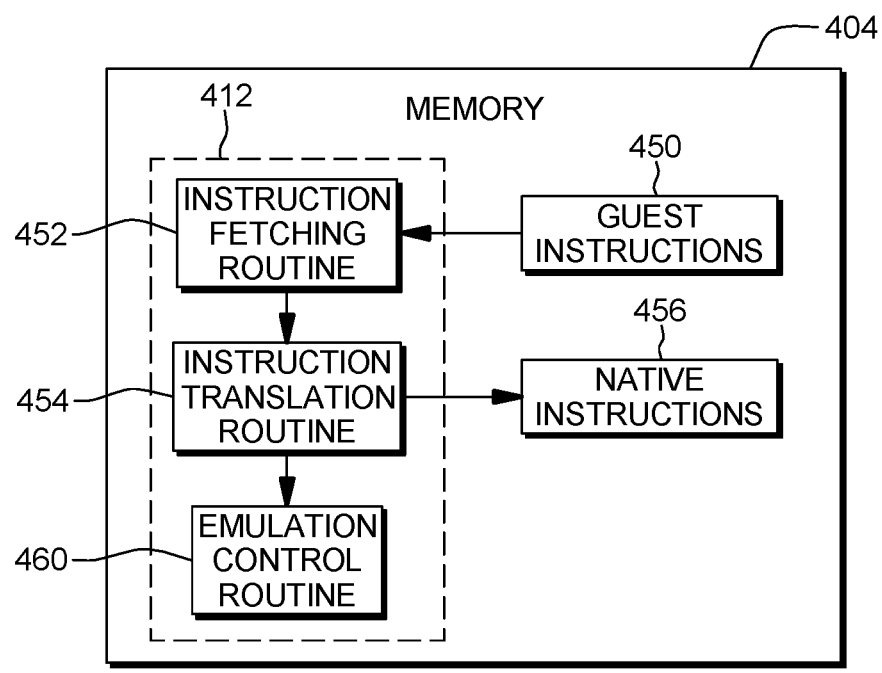
FIG. 4B depicts further details of the memory of FIG. 4A, in accordance with one or more aspects of the present invention.

Further details relating to emulator code 412 are described with reference to FIG. 4B. Guest instructions 450 stored in memory 404 comprise software instructions (e.g., correlating to machine instructions) that were developed to be executed in an architecture other than that of native CPU 402. For example, guest instructions 450 may have been designed to execute on a z/Architecture® processor, but instead, are being emulated on native CPU 402, which may be, for example, an Intel Itanium II processor. In one example, emulator code 412 includes an instruction fetching routine 452 to obtain one or more guest instructions 450 from memory 404, and to optionally provide local buffering for the instructions obtained. It also includes an instruction translation routine 454 to determine the type of guest instruction that has been obtained and to translate the guest instruction into one or more corresponding native instructions 456. This translation includes, for instance, identifying the function to be performed by the guest instruction and choosing the native instruction(s) to perform that function.

Further, emulator code 412 includes an emulation control routine 460 to cause the native instructions to be executed. Emulation control routine 460 may cause native CPU 402 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 456 may include loading data into a register from memory 404; storing data back to memory from a register; or performing some type of arithmetic or logic operation, as determined by the translation routine.

Each routine is, for instance, implemented in software, which is stored in memory and executed by native central processing unit 402. In other examples, one or more of the routines or operations are implemented in firmware, hardware, software or some combination thereof. The registers of the emulated processor may be emulated using registers 410 of the native CPU or by using locations in memory 404. In embodiments, guest instructions 450, native instructions 456 and emulator code 412 may reside in the same memory or may be disbursed among different memory devices.

Exemplary embodiments of further computing environments to implement one or more aspects of the present invention are described below with reference to FIGS. 5-7.

Figure 5:
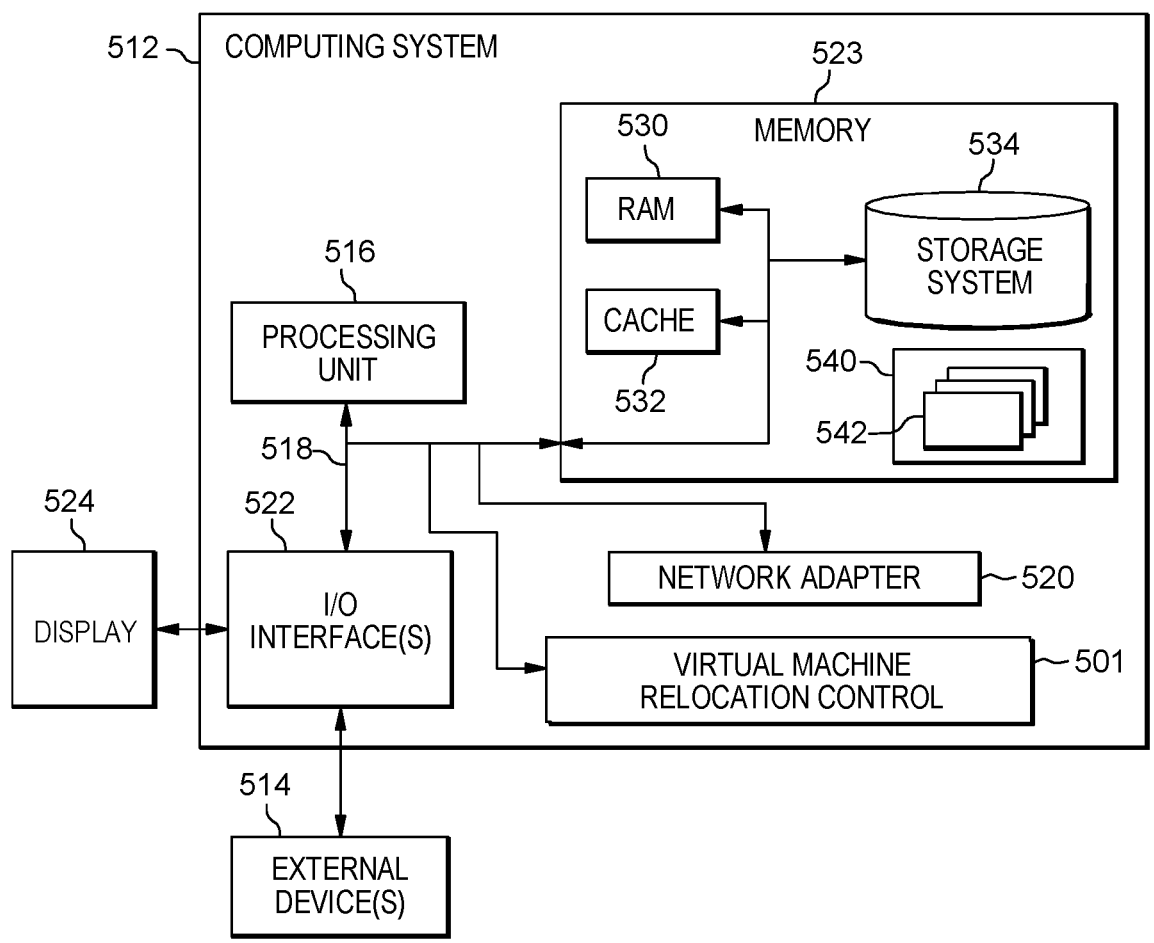
FIG. 5 depicts a further embodiment of a computing system which may incorporate virtual machine relocation processing, in accordance with one or more aspects of the present invention.

By way of further example, FIG. 5 depicts one embodiment of a computing environment 500, which includes a computing system 512. Examples of well-known computing systems, environments, and/or configurations that may be suitable for use with computer system 512 include, but are not limited to, a desktop computer, a workstation, a handheld or laptop computer or device, a mobile phone, a programmable consumer electronic device, a tablet, a personal digital assistant (PDA), and the like.

Computing system 512 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 5, computing system 512, is shown in the form of a general-purpose computing device. The components of computing system 512 may include, but are not limited to, one or more processors or processing units 516, a system memory 523, and a bus 518 that couples various system components including system memory 523 to processor 516.

In one embodiment, processor 516 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, New York, USA. Other names used herein may be registered trademarks, trademarks, or product names of International Business Machines Corporation or other companies.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 512 may include a variety of computer system readable media. Such media may be any available media that is accessible by computing system 512, and it includes both volatile and non-volatile media, removable and non-removable media.

System memory 523 can include computer system readable media in the form of volatile memory, such as random access memory (RAM) 530 and/or cache memory 532. Computing system 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided.

In such instances, each can be connected to bus 518 by one or more data media interfaces. As described below, memory 523 may include at least one program product having a set (e.g., at least one) of program modules that are configured to carry out the functions of embodiments of the invention.

Program/utility 540, having a set (at least one) of program modules 542, may be stored in memory 532 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Alternatively, a separate, virtual machine relocation control, system, module, logic, etc., 501 may be provided within computing environment 512.

Computing system 512 may also communicate with one or more external devices 514 such as a keyboard, a pointing device, a display 524, etc.; one or more devices that enable a user to interact with computing system 512; and/or any devices (e.g., network card, modem, etc.) that enable computing system 512 to communicate with one or more other computing devices. Such communication can occur via Input/Output (I/O) interfaces 522. Still yet, computing system 512 can communicate with one or more networks such as a local area network (LAN), a general wide area network (WAN), and/or a public network (e.g., the Internet) via network adapter 520. As depicted, network adapter 520 communicates with the other components of computing system, 512, via bus 518. It should be understood that although not shown, other hardware and/or software components could be used in conjunction with computing system 512. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 5. Computer system/server 512 of FIG. 5 may be practiced in distributed cloud computing environments where tasks are performed by remote processing devices that are linked through a communications network. In a distributed cloud computing environment, program modules may be located in both local and remote computer system storage media including memory storage devices. Computer system/server 512 is capable of being implemented and/or performing any of the functionality set forth hereinabove.

Figure 6:
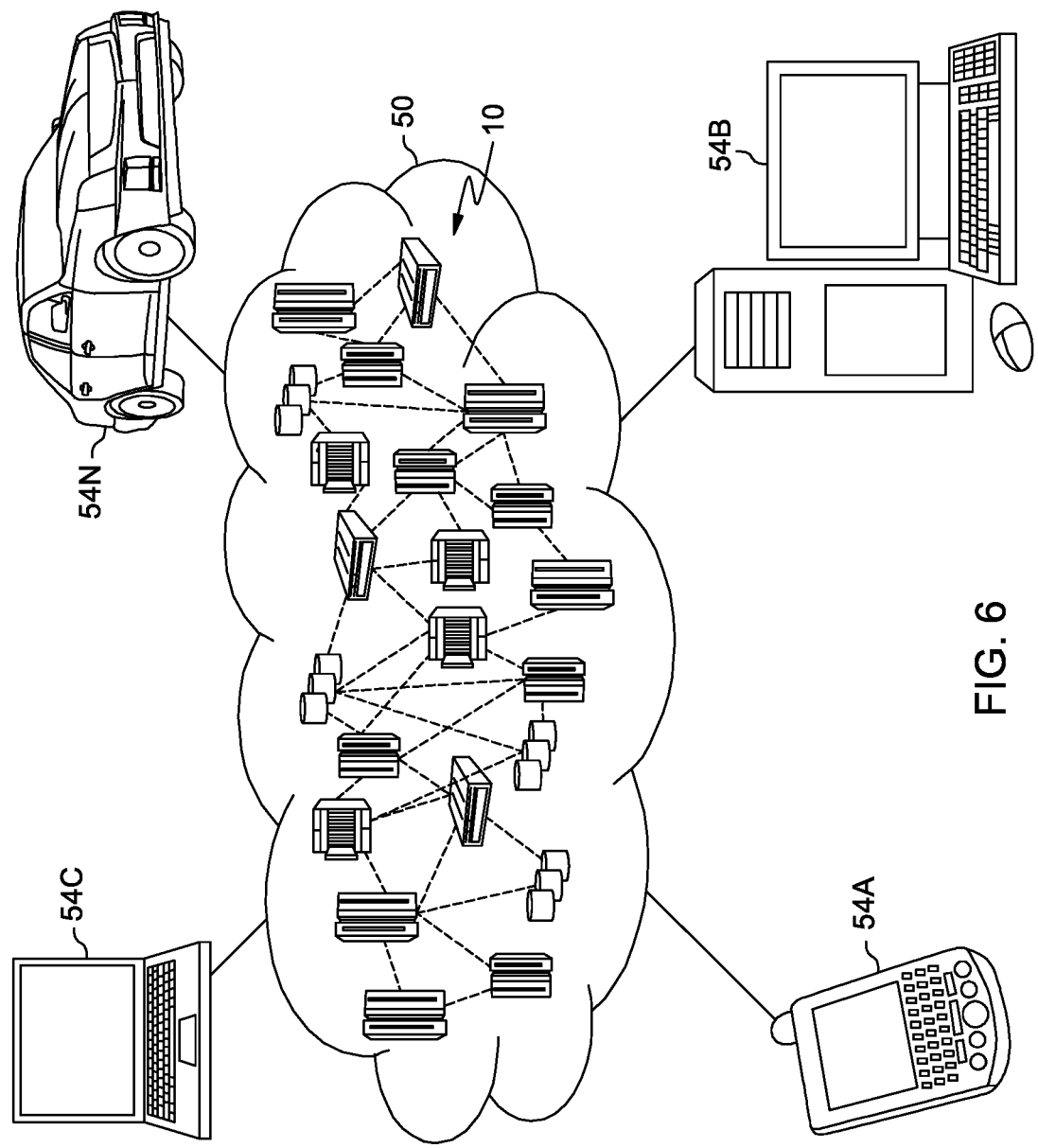
FIG. 6 depicts one embodiment of a cloud computing environment, which may facilitate implementing, or be used in association with, one or more aspects of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
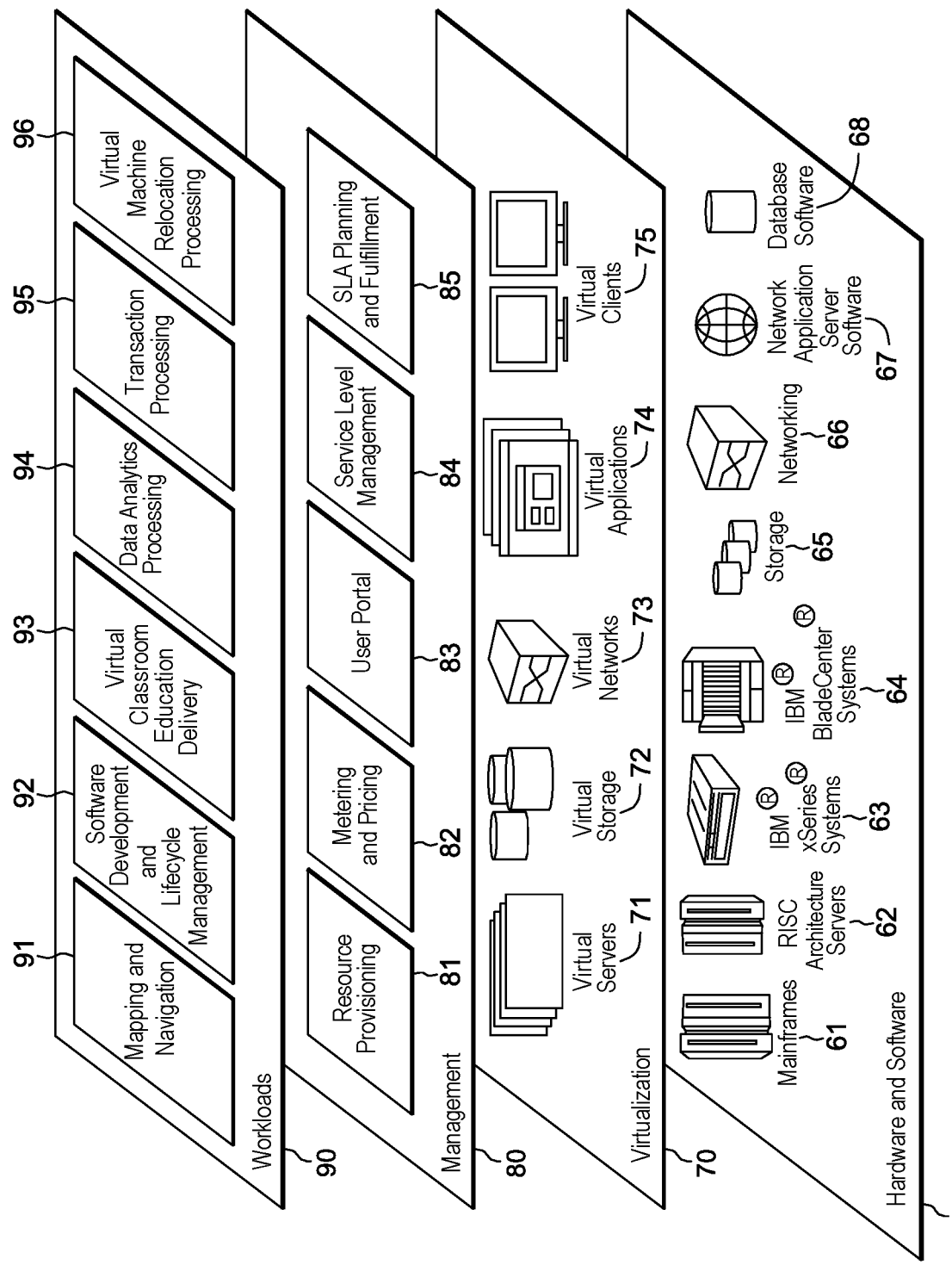
FIG. 7 depicts an example of extraction model layers, which may facilitate implementing relocating of virtual machines, in accordance with one or more aspects of the present invention.

Referring to FIG. 7, a set of functional abstraction layers provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing unit (PU) virtual machine relocation processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
    obtaining, by a first controller, first power-related information from a first power system set comprising one or more first power systems powering a first set of powered hardware components with which the first controller is associated, the first set of powered hardware components running a first plurality of virtual machines, and the first power-related information including an estimated amount of time to power failure to the first set of powered hardware components;
    determining, by the first controller, that the estimated amount of time to power failure is an insufficient amount of time to live-migrate all virtual machines of the first plurality of virtual machines;
    querying, by the first controller, a network power system to obtain network power-related information, the network power system powering a network with a first data transfer path from the first set of powered hardware components to a second set of powered hardware components, where the first data transfer path is one of a plurality of data transfer paths, where the network power system powering the network is different from the one or more first power systems powering the first set of powered hardware components and is different from one or more second power systems powering the second set of powered hardware components, where the first set of powered hardware components and the second set of powered hardware components are in separate geographically-separated data centers, with the network being separate from and disposed between the separate geographically-separated data centers, and where an intermediary set of powered hardware components is employed across the plurality of data transfer paths;
    based on determining that the estimated amount of time to power failure is an insufficient amount of time to live-migrate all virtual machines of the first plurality of virtual machines:
        referencing historical migrating data relating to an amount of migration time required to migrate one or more virtual machines;
        referencing historical snapshotting data relating to an amount of snapshotting time required to snapshot one or more virtual machines;
        selecting, by the first controller, a first subset of one or more virtual machines of the first plurality of virtual machines that is eligible to be live-migrated through one or more switches along the first data transfer path from the first set of powered hardware components to the second set of powered hardware components, based on the referenced historical migrating data; and
        selecting, by the first controller, a snapshot for a second subset of one or more virtual machines of the first plurality of virtual machines that is eligible to be created and subsequently forwarded to the intermediary set of powered hardware components located between the first set of powered hardware components and the second set of powered hardware components, based on the referenced historical snapshotting data;
    dynamically generating, by the first controller, a relocation protocol for migrating the first plurality of virtual machines based, at least in part, upon the first power-related information and the network power-related information, the relocation protocol being an emergency relocation protocol dynamically generated based, at least in part, on the estimated amount of time to power failure to the first set of powered hardware components being insufficient to live-migrate all virtual machines of the first plurality of virtual machines, and the dynamically generating comprising assigning, by the first controller, a virtual machine of the first plurality of virtual machines to the first subset of one or more virtual machines of the first plurality of virtual machines to be live migrated or the second subset of one or more virtual machines of the first plurality of virtual machines to be snapshotted for migration, the assigning being based, at least in part, upon 1) the obtained first power-related information, 2) the queried network power-related information, 3) the estimated amount of time to power failure, 4) the selection of the first subset of one or more virtual machines of the first plurality of virtual machines is eligible to be live-migrated, and 5) the selection of the snapshot for the second subset of one or more virtual machines of the first plurality of virtual machines is eligible to be created and transmitted to the intermediary set of powered hardware components;

performing, within one of the data centers, a series of actions within the relocation protocol, the series of actions consisting of:

a live migration of the first subset of one or more virtual machines of the first plurality of virtual machines comprising a transfer of the first subset of one or more virtual machines of the first plurality of virtual machines through one or more direct switches of the first data transfer path from the first set of powered hardware components to the second set of powered hardware components, where the first subset of virtual machine(s) is migrated to and runs on the second set of powered hardware components, and where the first subset of virtual machine(s) continues to operate through the live migration; and a snapshotting of the second subset of one or more virtual machines of the first plurality of virtual machines comprising a forwarding of snapshot data associated with the second subset of one or more virtual machines of the first plurality of virtual machines from the first set of powered hardware components to the intermediary set of powered hardware components through one or more intermediate switches on a different data transfer path of the plurality of data transfer paths separate from the first data transfer path; and migrating the first plurality of virtual machines, by performing the relocation protocol, to the second set of powered hardware components.

2. The computer-implemented method of claim 1, wherein the migrating comprises:

migrating the second subset of virtual machine(s) by, at least in part, deploying the second subset of virtual machine(s) to the second set of powered hardware components based on respective snapshot(s) of the second subset of virtual machine(s) obtained at the first set of powered hardware components.

3. The computer-implemented method of claim 2, wherein the migrating of the second subset of virtual machine(s) is performed after completion of the migrating of the first subset of virtual machine(s).

4. The computer-implemented method of claim 2, wherein the migrating the second subset of virtual machine(s) includes first transferring the respective snapshot(s) of the virtual machine(s) of the second subset of virtual machine(s) to the intermediary set of powered hardware components powered by an intermediary power system set before deploying the second subset of virtual machine(s) to the second set of powered hardware components based on their respective snapshot(s), the intermediary power system set being different from the first power system set.

5. The computer-implemented method of claim 4, wherein the transferring the respective snapshot(s) of the virtual machine(s) of the second subset of virtual machine(s) to the intermediary set of powered hardware components occurs concurrent with the migrating of the first subset of virtual machine(s) to the second set of powered hardware components.

6. The computer-implemented method of claim 2, wherein the first set of powered hardware components are of a first cloud, the first controller being a first cloud controller, and the second set of powered hardware components are of a second cloud, the second set of powered hardware components being powered from a second power system set comprising the one or more second power systems.

7. The computer-implemented method of claim 6, wherein the first cloud and the second cloud are hosted in the different, geographically-separated data centers.

8. The computer-implemented method of claim 6, wherein the second cloud includes a second cloud controller, and the generating further comprises obtaining, by the first cloud controller, second power-related information from the second cloud controller or the second power system set indicative of power status to the second set of powered hardware components.

9. The computer-implemented method of claim 1, wherein the generating, by the first controller, the relocation protocol includes referencing historical data relating to at least one of virtual machine migrating or virtual machine snapshotting to facilitate placing at least one virtual machine of the first plurality of virtual machines in either the first subset of virtual machine(s) or the second subset of virtual machine(s).

10. The computer-implemented method of claim 1, wherein the generating, by the first controller, the relocation protocol includes using associated priority information of at least one virtual machine of the first plurality of virtual machines in placing the at least one virtual machine in either the first subset of virtual machine(s) or the second subset of virtual machine(s).

11. The computer-implemented method of claim 1, wherein the obtaining, by the first controller, the network power-related information includes determining power status to one or more network switches of the network in the first data transfer path from the first set of powered hardware components to the second set of powered hardware components.

12. A system for facilitating relocating virtual machines, the system comprising:

a memory; and a processing circuit communicatively coupled with the memory, wherein the system performs a method comprising:

obtaining, by a first controller, first power-related information from a first power system set comprising one or more first power systems powering a first set of powered hardware components with which the first controller is associated, the first set of powered hardware components running a first plurality of virtual machines, and the first power-related information including an estimated amount of time to power failure to the first set of powered hardware components;

determining, by the first controller, that the estimated amount of time to power failure is an insufficient amount of time to live-migrate all virtual machines of the first plurality of virtual machines;

querying, by the first controller, a network power system to obtain network power-related information, the network power system powering a network with a first data transfer path from the first set of powered hardware components to a second set of powered hardware components, where the first data transfer path is one of a plurality of data transfer paths, where the network power system powering the network is different from the one or more first power systems powering the first set of powered hardware components and is different from one or more second power systems powering the second set of powered hardware components, where the first set of powered hardware components and the second set of powered hardware components are in separate geographically-separated data centers, with the network being separate from and disposed between the separate geographically-separated data centers, and where an intermediary set of powered hardware components is employed across the plurality of data transfer paths;

based on determining that the estimated amount of time to power failure is an insufficient amount of time to live-migrate all virtual machines of the first plurality of virtual machines:

referencing historical migrating data relating to an amount of migration time required to migrate one or more virtual machines;

referencing historical snapshotting data relating to an amount of snapshotting time required to snapshot one or more virtual machines;

selecting, by the first controller, a first subset of one or more virtual machines of the first plurality of virtual machines that is eligible to be live-migrated through one or more switches along the first data transfer path from the first set of powered hardware components to the second set of powered hardware components, based on the referenced historical migrating data; and selecting, by the first controller, a snapshot for a second subset of one or more virtual machines of the first plurality of virtual machines that is eligible to be created and subsequently forwarded to the intermediary set of powered hardware components located between the first set of powered hardware components and the second set of powered hardware components, based on the referenced historical snapshotting data;

dynamically generating, by the first controller, a relocation protocol for migrating the first plurality of virtual machines based, at least in part, upon the first power-related information and the network power-related information, the relocation protocol being an emergency relocation protocol dynamically generated based, at least in part, on the estimated amount of time to power failure to the first set of powered hardware components being insufficient to live-migrate all virtual machines of the first plurality of virtual machines, and the dynamically generating comprising assigning, by the first controller, a virtual machine of the first plurality of virtual machines to the first subset of one or more virtual machines of the first plurality of virtual machines to be live migrated or the second subset of one or more virtual machines of the first plurality of virtual machines to be snapshotted for migration, the assigning being based, at least in part, upon 1) the obtained first power-related information, 2) the queried network power-related information, 3) the estimated amount of time to power failure, 4) the selection of the first subset of one or more virtual machines of the first plurality of virtual machines is eligible to be live-migrated, and 5) the selection of the snapshot for the second subset of one or more virtual machines of the first plurality of virtual machines is eligible to be created and transmitted to the intermediary set of powered hardware components;

performing, within one of the data centers, a series of actions within the relocation protocol, the series of actions consisting of:

a live migration of the first subset of one or more virtual machines of the first plurality of virtual machines comprising a transfer of the first subset of one or more virtual machines of the first plurality of virtual machines through one or more direct switches of the first data transfer path from the first set of powered hardware components to the second set of powered hardware components, where the first subset of virtual machine(s) is migrated to and runs on the second set of powered hardware components, and where the first subset of virtual machine(s) continues to operate through the live migration; and a snapshotting of the second subset of one or more virtual machines of the first plurality of virtual machines comprising a forwarding of snapshot data associated with the second subset of one or more virtual machines of the first plurality of virtual machines from the first set of powered hardware components to the intermediary set of powered hardware components through one or more intermediate switches on a different data transfer path of the plurality of data transfer paths separate from the first data transfer path; and migrating the first plurality of virtual machines, by performing the relocation protocol, to the second set of powered hardware components.

13. The system of claim 12, wherein the migrating comprises:
migrating the second subset of virtual machine(s) by, at least in part, deploying the second subset of virtual machine(s) to the second set of powered hardware components based on respective snapshot(s) of the second subset of virtual machine(s) obtained at the first set of powered hardware components.

14. The system of claim 13, wherein the migrating of the second subset of virtual machine(s) is performed after completion of the migrating of the first subset of virtual machine(s).

15. The system of claim 13, wherein:
the migrating the second subset of virtual machine(s) includes first transferring the respective snapshot(s) of the virtual machine(s) of the second subset of virtual machine(s) to the intermediary set of powered hardware components powered by an intermediary power system set before deploying the second subset of virtual machine(s) to the second set of powered hardware components based on their respective snapshot(s), the intermediary power system set being different from the first power system set; and
the transferring of the respective snapshot(s) of the virtual machine(s) of the second subset of virtual machine(s) to the intermediary set of powered hardware components occurs concurrent with the migrating of the first subset of virtual machine(s) to the second set of powered hardware components.

16. The system of claim 13, wherein the first set of powered hardware components are of a first cloud, the first controller being a first cloud controller, and the second set of powered hardware components are of a second cloud, the second set of powered hardware components being powered from a second power system set comprising the one or more second power systems.

17. The system of claim 16, wherein the second cloud includes a second cloud controller, and the generating further comprises obtaining, by the first cloud controller, second power-related information from the second cloud controller or the second power system set indicative of power status to the second set of powered hardware components.

18. The system of claim 12, wherein the generating, by the first controller, the relocation protocol includes referencing information selected from a set consisting of historical data relating to at least one of virtual machine migrating or virtual machine snapshotting, or associated priority information of at least one virtual machine of the first plurality of virtual machines, the referencing information facilitating placing at least one virtual machine in either the first subset of virtual machine(s) or the second subset of virtual machine(s).

19. A computer program product for facilitating relocating virtual machines, the computer program product comprising:
a non-transitory computer-readable storage medium readable by a processing circuit and storing instructions for execution by the processing circuit for performing a method comprising:
  obtaining, by a first controller, first power-related information from a first power system set comprising one or more first power systems powering a first set of powered hardware components with which the first controller is associated, the first set of powered hardware components running a first plurality of virtual machines, and the first power-related information including an estimated amount of time to power failure to the first set of powered hardware components;
  determining, by the first controller, that the estimated amount of time to power failure is an insufficient amount of time to live-migrate all virtual machines of the first plurality of virtual machines;
  querying, by the first controller, a network power system to obtain network power-related information, the network power system powering a network with a first data transfer path from the first set of powered hardware components to a second set of powered hardware components, where the first data transfer path is one of a plurality of data transfer paths, where the network power system powering the network is different from the one or more first power systems powering the first set of powered hardware components and is different from one or more second power systems powering the second set of powered hardware components, where the first set of powered hardware components and the second set of powered hardware components are in separate geographically-separated data centers, with the network being separate from and disposed between the separate geographically-separated data centers, and where an intermediary set of powered hardware components is employed across the plurality of data transfer paths;
  based on determining that the estimated amount of time to power failure is an insufficient amount of time to live-migrate all virtual machines of the first plurality of virtual machines:
    referencing historical migrating data relating to an amount of migration time required to migrate one or more virtual machines;
    referencing historical snapshotting data relating to an amount of snapshotting time required to snapshot one or more virtual machines;
    selecting, by the first controller, a first subset of one or more virtual machines of the first plurality of virtual machines that is eligible to be live-migrated through one or more switches along the first data transfer path from the first set of powered hardware components to the second set of powered hardware components, based on the referenced historical migrating data; and
    selecting, by the first controller, a snapshot for a second subset of one or more virtual machines of the first plurality of virtual machines that is eligible to be created and subsequently forwarded to the intermediary set of powered hardware components located between the first set of powered hardware components and the second set of powered hardware components,
  based on the referenced historical snapshotting data;
  dynamically generating, by the first controller, a relocation protocol for migrating the first plurality of virtual machines based, at least in part, upon the first power-related information and the network power-related information, the relocation protocol being an emergency relocation protocol dynamically generated based, at least in part, on the estimated amount of time to power failure to the first set of powered hardware components being insufficient to live-migrate all virtual machines of the first plurality of virtual machines, and the dynamically generating comprising assigning, by the first controller, a virtual machine of the first plurality of virtual machines to the first subset of one or more virtual machines of the first plurality of virtual machines to be live migrated or the second subset of one or more virtual machines of the first plurality of virtual machines to be snapshotted for migration, the assigning being based, at least in part, upon 1) the obtained first power-related information, 2) the queried network power-related information, 3) the estimated amount of time to power failure, 4) the selection of the first subset of one or more virtual machines of the first plurality of virtual machines is eligible to be live-migrated, and 5) the selection of the snapshot for the second subset of one or more virtual machines of the first plurality of virtual machines is eligible to be created and transmitted to the intermediary set of powered hardware components;
  performing, within one of the data centers, a series of actions within the relocation protocol, the series of actions consisting of:
    a live migration of the first subset of one or more virtual machines of the first plurality of virtual machines comprising a transfer of the first subset of one or more virtual machines of the first plurality of virtual machines through one or more direct switches of the first data transfer path from the first set of powered hardware components to the second set of powered hardware components, where the first subset of virtual machine(s) is migrated to and runs on the second set of powered hardware components, and where the first subset of virtual machine(s) continues to operate through the live migration; and a snapshotting of the second subset of one or more virtual machines of the first plurality of virtual machines comprising a forwarding of snapshot data associated with the second subset of one or more virtual machines of the first plurality of virtual machines from the first set of powered hardware components to the intermediary set of powered hardware components through one or more intermediate switches on a different data transfer path of the plurality of data transfer paths separate from the first data transfer path; and migrating the first plurality of virtual machines, by performing the relocation protocol, to the second set of powered hardware components.

20. The computer program product of claim 19, wherein the migration comprises:

migrating the second subset of virtual machine(s) by, at least in part, deploying the second subset of virtual machine(s) to the second set of powered hardware components based on respective snapshot(s) of the second subset of virtual machine(s) obtained at the first set of powered hardware components.

* * * * *